United States Patent
Laroia et al.

(10) Patent No.: US 6,473,418 B1
(45) Date of Patent: Oct. 29, 2002

(54) ORTHOGONAL FREQUENCY DIVISION MULTIPLEXING BASED SPREAD SPECTRUM MULTIPLE ACCESS

(75) Inventors: Rajiv Laroia, Princeton Junction, NJ (US); Junyi Li, Lakewood, NJ (US); Michaela Catalina Vanderveen, Lincroft, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 09/267,471

(22) Filed: Mar. 11, 1999

(51) Int. Cl.$^7$ ............................................. H04B 1/713
(52) U.S. Cl. ..................... 370/344; 375/132; 375/133
(58) Field of Search .......................... 370/337, 335, 370/343, 280, 330, 344; 375/130, 133, 132; 455/502; 348/21

(56) References Cited

U.S. PATENT DOCUMENTS

| | | | | |
|---|---|---|---|---|
| 5,446,769 A | * | 8/1995 | Shaver et al. ............... | 375/134 |
| 5,638,399 A | * | 6/1997 | Schuchman et al. ........ | 370/324 |
| 5,737,358 A | * | 4/1998 | Ritz et al. ................... | 375/133 |
| 6,018,317 A | * | 1/2000 | Dogan et al. ............... | 342/378 |

OTHER PUBLICATIONS

"Channel Coding Strategies for Cellular Radio" by Gregory J. Pottie and A. Robert Calderbank; IEEE Transactions on Vehicular Technology, vol. 44, No. 4, Nov. 1995.*
G. J. Pottie and A. R. Calderbank, Channel Coding Strategies for Cellular Radio, pp. 763–770 of IEEE Transactions On Vehicular Technology, vol. 44, No. 4, (Nov. 1995).
Yabusaki, M., "Channel Reassignment Algorithm in Multiple Carrier Hopping TDMA Systems" IEEE Transactions on Cummunications, vol. 41, No. 2, Feb. 1993, pp. 381–390.
Iida, M. and Marubayashi, G., "Multi–Tone Combinatory Frequency Hopping System", IEEE International Symposium On Spread Spectrum Techniques And Applications, Sep. 22–25, 1996, pp. 893–897.
Ohkawa, M. et al., "Orthogonal Multi–Carrier FH–CDMA Scheme For Frequency Selective Fading", ICCS, Nov., 1994, pp. 612–619.

* cited by examiner

Primary Examiner—Salvatore Cangialosi
(74) Attorney, Agent, or Firm—Straub & Pokotylo; Michael P. Straub

(57) ABSTRACT

In an orthogonal frequency division multiplexing (OFDM) based spread spectrum multiple access system the entire bandwidth is divided into orthogonal tones, and all of the orthogonal tones are reused in each cell. To reduce peak-to-average ratio at the mobile transmitter, each voice user is allocated preferably a single one, but no more than a very small number, of the orthogonal tones for use in communicating with the base station. Data users are similarly allocated tones for data communication, however, the number of tones assigned for each particular data user is a function of the data rate for that user. The tone assignment for a given user is not always the same within the available band, but instead the tones assigned to each user are hopped over time. More specifically, in the downlink, the tones assigned to each user are change relatively rapidly, e.g., from symbol to symbol, i.e., the user fast "hops" from one tone to another. However, in the uplink, preferably slow hopping is employed to allow efficient modulation of the uplink signal which necessitates the employing of additional techniques, such as interleaving, to compensate for the reduction in the intercell interference averaging effect. For data communication power control is employed in the uplink and/or downlink so that the transmission rate is increased, e.g., by increasing the number of symbols transmitted per tone per unit time or the coding rate, as a function of allocated power per tone and the corresponding channel attenuation.

33 Claims, 2 Drawing Sheets

ORTHOGONAL FREQUENCY DIVISION MULTIPLEXING BASED SPREAD SPECTRUM MULTIPLE ACCESS

TECHNICAL FIELD

This invention relates orthogonal frequency division multiplexing (OFDM) based spread spectrum multiple access such as may be used in wireless, and other, communication systems.

BACKGROUND OF THE INVENTION

It is desired that wireless communication systems be as efficient as possible to maximize a) the number of users that can be served and b) the data rates, if data service is provided. Wireless systems are shared media systems, i.e., there is a fixed available bandwidth that must be shared among all the users of the system. These systems are often implemented as so-called "cellular" systems, where the covered territory is divided into separate cells, and each cell is served by a base station.

It is well known in the art that the two particularly desirable features of a cellular wireless system are 1) that the intracell interference, i.e., interference experienced by one user that is caused by other users that are within the same cell as that user, be as small as possible, and 2) that the intercell interference, i.e., interference experienced by one user that is caused by other users that are in cells other than the one in which the user is located, is averaged across all users in neighboring cells. Most prior art digital cellular systems are time division multiple access (TDMA) systems, such as group special mobile (GSM)-, intermediate standard (IS)-136-, or IS-54-based systems, or they are code division multiple access (CDMA) systems, e.g., IS-95 based systems.

In prior art narrow band TDMA systems neighboring base stations use different, e.g., non-overlapping, parts of the available spectrum. However, bases stations that are sufficiently far away from each other to avoid substantial interference between them, i.e., non-neighboring base stations, may use the same parts of the available spectrum. Notwithstanding such spectrum reuse, the spectrum available for use in each cell is a small part of the total available spectrum. Each user in a cell has its own unique frequency band and time slot combination, and hence TDMA systems have no intracell interference, i.e., they have the first desirable feature of cellular wireless systems. However, TDMA systems do not have the second desirable feature, in that a given user only interferes with a small number of users outside the cell, so that spectral reuse is based on worst case interference rather than average interference. As a result, the system has a low "spectral" efficiency.

In prior art direct sequence (DS)-CDMA systems the entire bandwidth is used by each base station but each base station uses a different spreading code. Such CDMA systems promise higher spectral efficiency than narrow band TDMA systems. Thus, CDMA systems have the second desirable feature of a cellular wireless system. However, CDMA systems do not have the first desirable feature of a cellular wireless system because although the signals transmitted from the base station within a cell are orthogonal, because of channel dispersion, the signals received at a receiver are not necessarily orthogonal. This results in interference between users within the same cell.

Proposed prior art frequency hopping (FH)-CDMA systems are very similar to narrow band TDMA systems, except that they employ frequency hopping to also obtain the second desirable feature of a cellular wireless system. In particular, each transmitter transmits a narrow band signal, and periodically changes the carrier frequency to achieve the frequency hopping. However, disadvantageously, such hopping is relatively slow, reducing the amount of averaging that can be achieved for a given delay in the transmission path that the system can tolerate.

U.S. Pat. No. 5,410,538 issued to Roche et al. on Apr. 25, 1995 discloses a multi-tone CDMA system. Such a system is essentially an OFDM system that eliminates intracell interference by insuring that the received signals within a cell are orthogonal. Thus, the Roche et al. system has both desirable features of a cellular wireless system. However, the Roche et al. system partitions the spectrum into a large number of tones, which makes the system very susceptible to Doppler shifts in mobile systems. Also, because each mobile user transmits on a large number of tones, the peak-to-average ratio of the mobile transmitter is very high, resulting in poor power efficiency at the mobile station, which is disadvantageous in that power is often a limited resource in the mobile station.

U.S. Pat. No. 5,548,582 issued to Brajal et al. on Aug. 20, 1996 discloses a general wide-band orthogonal frequency division multiplexing (OFDM) based spread spectrum multiple access.

SUMMARY OF THE INVENTION

We have recognized that the Brajal et al. system is not optimized for use in a cellular system in that there is no teaching therein how to optimize a) the hopping pattern, b) the tone assignment, or c) the bandwidth reuse. We have further recognized that optimizing these factors, individually and/or collectively, is important to obtain a spectrally efficient system, i.e., a system that has the two particularly desirable features of a cellular wireless system. Therefore, in accordance with the principles of the invention the entire bandwidth of an OFDM multiple access system is divided into orthogonal tones, and all of the orthogonal tones are reused in each cell. To reduce peak-to-average ratio at the mobile transmitter, low bit rate user, such as a voice user, is allocated preferably a single one, but no more than a very small number, of the orthogonal tones for use in communicating with the base station. Data users are similarly allocated tones for data communication. However, the number of tones assigned for each data particular user is a function of the data rate for that user. The tone assignment for a given user is not always the same within the available band, but instead the tones assigned to each user are hopped over time.

In accordance with an aspect of the invention the tone hopping pattern is designed to achieve maximum frequency diversity and to average the intercell interference, e.g., using a pattern that is generated as a function of a mutually orthogonal latin square. More specifically, in the downlink. i.e., in the channel from the base station to the mobile station, the tones assigned to each user are change relatively rapidly, e.g., from symbol to symbol, i.e., the user fast "hops" from one tone to another. However, in the uplink, i.e., in the channel from the mobile station to the base station, although fast hopping is possible, it is inefficient, and so preferably slow hopping is employed to allow efficient modulation of the uplink signal. However, when slow hopping is used in the uplink, it is necessary to employ additional techniques, such as interleaving, to compensate for the reduction in the intercell interference averaging effect.

In accordance with another aspect of the invention for data communication power control is employed in the uplink and/or downlink so that the transmission rate is increased, e.g., by increasing the number of symbols transmitted per tone per unit time or the coding rate, as a function of allocated power per tone and the corresponding channel attenuation.

DETAILED DESCRIPTION

Figure 1:
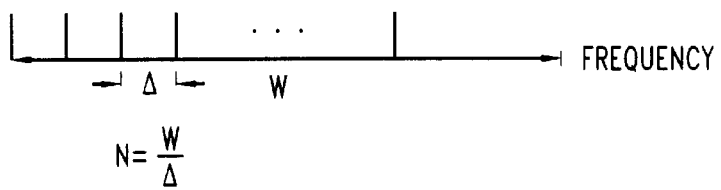
FIG. 1 shows an example of available orthogonal tones at one cell with a spacing of Δ, within a bandwidth W.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Before describing the invention it is necessary to understand generally the environment in which the invention operates, namely, orthogonal frequency division multiplexing (OFDM) systems.

Orthogonal frequency division multiplexing (OFDM) systems employ orthogonal tones within a frequency bandwidth to transmit data from different users at the same time. In particular, for any particular symbol period T which is available for symbol transmission, and a given bandwidth W, the number of available orthogonal tones N, is given by WT. In accordance with an aspect of the invention, the same bandwidth W is reused in each cell. The spacing between the orthogonal tones is Δ, which is given by 1/T. In addition to the symbol period T which is available for symbol transmission, an additional time Tc is required for transmission of a cyclic prefix, which is prepended to each symbol period and is used to compensate for the dispersion introduced by the channel response and the pulse shaping filter used at the transmitter. Thus, although a total period of T+Tc is employed, only T is available for user data transmission.

Figure 2:
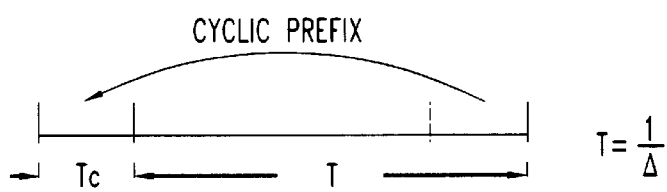
FIG. 2 shows a time domain view of the symbol period T which is available for symbol transmission, and the additional time Tc required for transmission of the cyclic prefix.

FIG. 1 shows an example of available orthogonal tones at one cell with a spacing of Δ within a bandwidth W. FIG. 2 shows a time domain view of the symbol period T which is available for symbol transmission, and the additional time Tc required for transmission of the cyclic prefix. Note that within each symbol period T data may be sent on each of the tones substantially simultaneously. Also, the last portion of the data symbol period T is often employed as the cyclic prefix in manner shown in FIG. 2.

Figure 3:
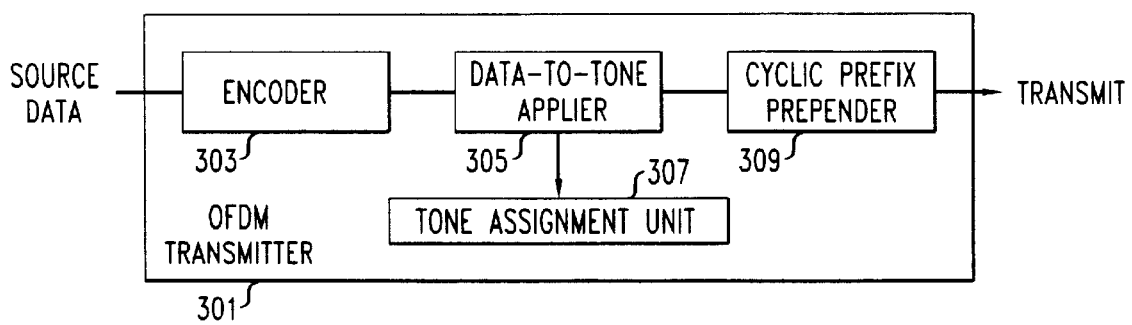
FIG. 3 shows a block diagram of an exemplary OFDM transmitter.

FIG. 3 shows a block diagram of exemplary OFDM transmitter 301. Because of its high level, whether or not the diagram of FIG. 3 depicts a prior art OFDM transmitter or an OFDM in accordance with the principles of the invention depends on the particular implementation of the various components of FIG. 3. Also, OFDM transmitter 301 may be used in either a base station as the downlink transmitter or in a mobile station as an uplink transmitter. The particular embodiments necessary for either application will be described more fully hereinbelow.

OFDM transmitter 301 includes a) encoder 303, b) data-to-tone applier 305, c) tone assignment unit 307, and d) cyclic prefix prepender 309.

Encoder 303 receives an overall information stream for transmission from a source and encodes it according to a particular encoding scheme. Such overall information stream typically includes information streams generated on behalf of more than one user if OFDM transmitter 301 is being used in a base station and only includes information streams for one user if OFDM transmitter 301 is being used in a mobile station. The encoding scheme employed may vary whether the information being transmitted in a particular information stream is voice or data. Those of ordinary skill in the art will be able to 1) select, e.g., traditional convolutional or block coding, or 2) devise, appropriate encoding schemes as a function of the model of the interference environment in which the OFDM system is being deployed.

Data-to-tone applier 305 modulates the overall encoded information stream supplied as an output from encoder 303 onto the various available tones. For each particular encoded information stream within the overall encoded information stream at least one tone is assigned by tone assignment unit 307, and that tone is used to modulate the particular encoded information stream received from encoder 303. If a particular encoded information stream is voice then, in accordance with an aspect of the invention, preferably a single one, but no more than a very small number, of the orthogonal tones are assigned for particular encoded information stream. If a particular encoded information stream is data then, in accordance with an aspect of the invention, the number of orthogonal tones assigned that particular encoded information stream is a function of the data rate for the user of that particular encoded information stream.

Tones are assigned to each encoded information stream by tone assignment unit 307, which conveys the assignments to data-to-tone applier 305. The tone assignment for a given user is not always the same within the available band, but instead the tones assigned to each user are hopped over time by tone assignment unit 307.

Cyclic prefix prepender 309 adds the cyclic prefix to each symbol period as described above. The cyclic prefix is added only for the tones being used by OFDM transmitter 301. Thus, for example, if OFDM transmitter 301 is in a base station using all of the tones, then the cyclic prefix uses all of the available orthogonal tones within bandwidth W. If OFDM transmitter 301 is in a mobile station using only a single one of the tones, then the cyclic prefix uses only that particular single tone. Advantageously, use of the cyclic prefix eliminates the need for equalization at the receiver.

Figure 4:
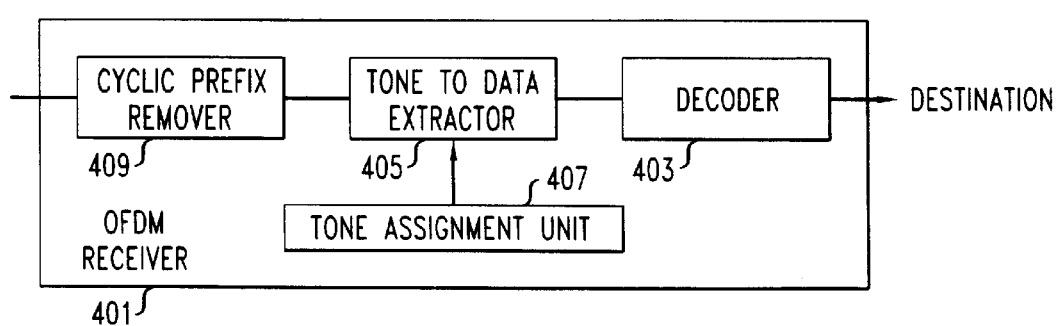
FIG. 4 shows a block diagram of an exemplary OFDM receiver.

FIG. 4 shows a block diagram of an exemplary OFDM receiver 401. As with FIG. 3 because of its high level, whether or not the diagram of FIG. 4 depicts a prior art OFDM receiver or an OFDM in accordance with the principles of the invention depends on the particular implementation of the various components of FIG. 4. Also, as shown OFDM receiver 401 may be used in either a base station as the downlink receiver or in a mobile station as an uplink receiver. The particular embodiments necessary for either application will be described more fully hereinbelow.

OFDM receiver 401 includes a) cyclic prefix remover 409, b) tone-to-data extractor 405, c) tone assignment unit 407, and d) decoder 403.

The signal received at OFDM receiver 401, e.g., by an antenna and amplifier arrangement, not shown, is supplied to cyclic prefix remover 409. Cyclic prefix remover 409 removes the cyclic prefix from each total period of the received signal. The remaining signal, with period T, is supplied to tone-to-data extactor 405.

Tone-to-data extractor 405 extracts each information stream received on the various available tones which are being used by OFDM receiver 401 to develop an overall reconstructed data stream. Tones are assigned for use by OFDM receiver 401 by tone assignment unit 407, which conveys the assignments to data-to-tone remover 405. The tone assignment for a given user is not always the same within the available band, but instead the tones assigned to each user are hopped over time by tone assignment unit 407. As a result, it is necessary that there be correspondence between tone assignment unit 307 of OFDM transmitter 301 and tone assignment unit 407 of an associated OFDM receiver 401. Such correspondence is typically achieved through a priori arrangement, e.g., upon call set up.

Decoder 403 receives an overall information stream from transmission tone-to-data extractor 405 and decodes it to develop an overall output information stream. The decoding is often performed according to the inverse of the scheme used to encode the information stream. However, modifications may be made to the decoding scheme to account for channel and other effects to produce a more reliable decoded output than simply using the inverse of the encoding scheme. Alternatively, specific algorithms may be developed for use in decoding the received signal that take into account channel response, interference, and other effects. Such overall output information stream typically includes information streams generated on behalf of more than one user if OFDM receiver 401 is being used in a base station and only includes information streams for one user if OFDM receiver 401 is being used in a mobile station.

The resulting overall output stream is supplied to a destination for further processing. For example, if the information stream is voice and OFDM receiver 401 is within a mobile station, then the information stream is supplied to be converted to an audible signal that is played for the user. If the information stream is voice and OFDM receiver 401 is within a base station, the voice information may be separated for transmission to the ultimate destination, e.g., via a wireline network.

Figure 5:
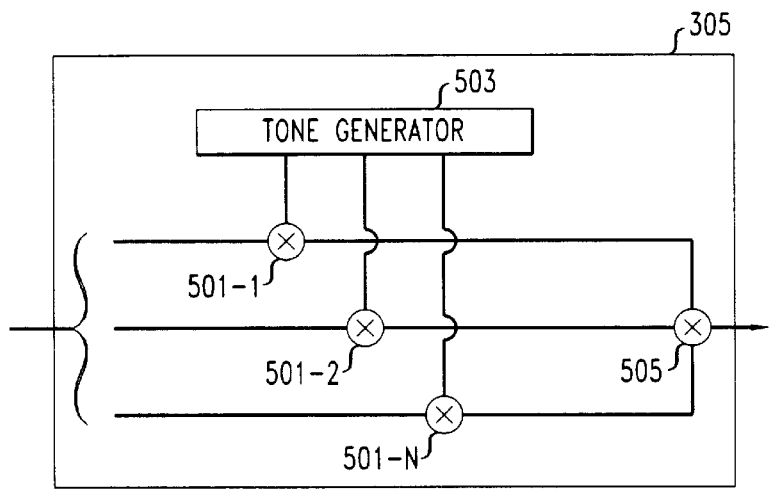
FIG. 5 shows further details of an exemplary implementation of data-to-tone applier of FIG. 3 for a base station.

FIG. 5 shows further details of an exemplary implementation of data-to-tone applier 305 for a base station. Each of multipliers 501 multiplies a particular information stream by a sinusoidal waveform which is one of the orthogonal tones and is generated by tone generator 503. The resulting modulated signals are then summed by adder 505. Typically, data-to-tone applier 305 is implemented digitally, e.g., by a processor performing the functionality of multipliers 501, tone generator 503, and adder 505 using digital representations of the orthogonal tones.

The same general architecture as shown in FIG. 5 may be used to implement data-to-tone applier 305 for a mobile station. However, instead of covering the entire range of N orthogonal tones used within the cell by the base station by having N multipliers, only the maximum number of orthogonal tones used by the mobile station need have available multipliers. Since many mobile stations are used strictly for voice, only one multiplier need be provided. However, since, as will be described in more detail hereinbelow, the tone assignments for each user are changed, it is necessary that the tone generator in a mobile station be able to generate the entire range of N orthogonal tones. Furthermore, if only one tone is used, adder 505 may be dispensed with.

As described above, the tones assigned to any particular information stream is changed periodically. This is known in the art generally as frequency hopping, and is referred to herein more specifically as tone hopping. In accordance with an aspect of the invention, the tone hopping pattern is designed to achieve maximum frequency diversity and to average the intercell interference. This may be achieved by using a hopping pattern that is generated as a function of a mutually orthogonal latin square. See, for example, *Channel Coding Strategies for Cellular Radio* by Gregory J. Pottie and A. Robert Calderbank published in IEEE Transactions on Vehicular Technology, Vol. 44, No. 4, pp. 763–770, November 1995.

In accordance with an aspect of the invention, in the downlink. i.e., in the channel from the base station to the mobile station, the tones assigned to each user, e.g., by tone assignment unit 307 (FIG. 3), are change relatively rapidly, e.g., from symbol to symbol, i.e., the user fast "hops" from one tone to another. However, in the uplink, i.e., in the channel from the mobile station to the base station, although fast hopping is possible, it is inefficient, and so preferably slow hopping is employed, e.g., by tone assignment unit 307, to allow efficient modulation of the uplink signal.

The reason that it is desirable to employ fast hopping is to achieve quickly the advantages of averaging. Fast hopping can be effectively employed for the downlink because of the availability of a pilot signal that is transmitted by the base station and shared by all of the mobile stations. Each mobile station can use the received pilot signal to determine the characteristics of the channel between itself and the base station. Once the channel characteristics are known, the mobile station may use that knowledge to perform coherent detection, which is a desirable form of detection for OFDM systems because it has better performance for a given signal to interference ratio. In particular, coherent detection permits accurate demodulation of the received signal using only one symbol.

In the uplink there is no pilot signal available because each mobile station would have to generate its own pilot signal, and to use a pilot signal for each mobile station is costly, almost to the point of being prohibitive, in terms of available bandwidth. As a result, the uplink channel characteristics between each mobile station and the base station cannot be determined by the base station. Without information on the uplink channel characteristics the base station cannot perform coherent detection. As a result, other detection techniques, e.g., differential demodulation or training symbol based demodulation, are required to insure accurate demodulation of the transmitted signal. These other detection techniques require that each user remain on the same tone for several symbols, with the more symbols for which the user remains on the same tone increasing the efficiency of the channel usage.

The intercell interference averaging is reduced when slow hopping is used because interfering users remain on the same tone for a longer period of time. Thus, it takes more time to spread the interfering effects among the mobile stations within a cell. It is therefore necessary to employ additional techniques, such as interleaving, to compensate for the reduction in the intercell interference averaging effect when slow hopping is used in the uplink.

Figure 6:
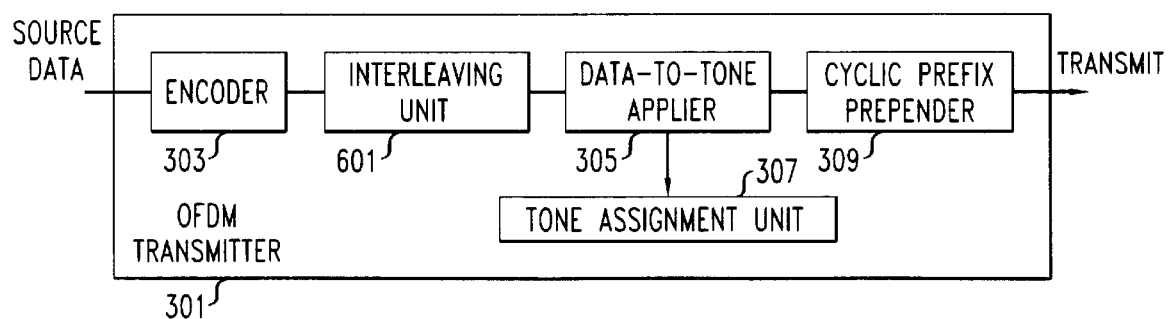
FIG. 6 shows a block diagram of another exemplary OFDM transmitter.

More specifically, as shown in FIG. 6. interleaving unit 601 may be incorporated in OFDM transmitter 301 between encoder 303, and data-to-tone applier 305. The function of interleaving unit 601 is to interleave the symbols that are to be applied by data-to-tone applier 305 for a user, e.g., for a particular tone if the user is a voice user employing only one of the orthogonal tones. Thus, instead of all the symbols generated by encoder 303 being transmitted sequentially, they are transmitted out of order in a manner that is preferably likely to facilitate error correction by the receiver in the event that some of the symbols are not received correctly due to interference. Note that the interleaving pattern for each user, or for groups of users, may be different. For example, it may be desirable to use a first interleave pattern for voice users, which can tolerate less delay but some error in the signal, and a second interleave pattern for data users who can tolerate greater delay but less error. Also, interleaving may be performed among the information streams assigned to various tones of a single user.

Figure 7:
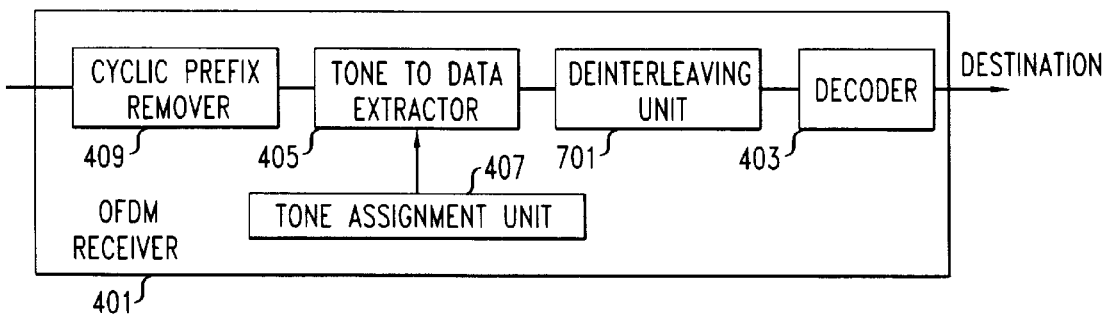
FIG. 7 shows a block diagram of another exemplary OFDM receiver.

Similarly, as shown in FIG. 7, deinterleaving unit 701 is incorporated into OFDM receiver 401 between tone-to-data extractor 405 and decoder 403. Deinterleaving unit 701 reverses the interleaving process performed by interleaving unit 601 on the information stream of a user, to restore a noninterleaved information stream.

What is claimed is:

1. A method for operating a cellular orthogonal frequency division multiplexing (OFDM) based spread spectrum multiple access wireless system, comprising the steps of:

allocating a very small number of orthogonal tones for use by each user communicating low bit rate information;

hopping said allocated tones through an available spectrum over time, wherein in a downlink of said system said allocated tones are fast hopped and in an uplink of said system said allocated tones are slow hopped.

2. The invention as defined in claim 1 wherein said very small number is one.

3. The invention as defined in claim 1 wherein said low hit rate information is voice.

4. The invention as defined in claim 1 wherein said allocated tones are hopped using a pattern that is a function of a mutually orthogonal latin square.

5. The invention as defined in claim 1 further including the step of allocating a number of orthogonal tones larger than said very small number for each user communicating higher bit rate information.

6. The invention as defined in claim 5 wherein said higher bit rate information is data.

7. The invention as defined in claim 5 wherein said hopping step also hops said tones allocated for each user communicating higher bit rate information along with said tones allocated for each user communicating low bit rate information.

8. The invention as defined in claim 6 wherein power control is performed in the downlink for said data so the number of symbols transmitted per tone for data is a function of allocated power per tone and downlink channel attenuation.

9. The invention as defined in claim 6 wherein power control is performed in the uplink for said data so the number of symbols transmitted per tone for data is a function of allocated power per tone and uplink channel attenuation.

10. A method for operating a cellular orthogonal frequency division multiplexing (OFDM) based spread spectrum multiple access wireless system, comprising the steps of:

allocating orthogonal tones for use in communicating data;

hopping said allocated tones through an available spectrum over time, wherein in a downlink of said system said allocated tones are fast hopped and in an uplink of said system said allocated tones are slow hopped.

11. The invention as defined in claim 10 wherein power control is performed in the downlink for data communication so that the number of symbols transmitted per tone is a function of allocated power per tone and downlink channel attenuation.

12. The invention as defined in claim 10 wherein power control is performed in the uplink for data communication so that the number of symbols transmitted per tone is a function of allocated power per tone and uplink channel attenuation.

13. A method for operating a cellular orthogonal frequency division multiplexing (OFDM) based spread spectrum multiple access wireless system, comprising the steps of:

allocating to a wireless terminal a number of orthogonal tones for use in communicating by the wireless terminal with a base station; and hopping said allocated tones through an available spectrum over time, wherein tones used as a downlink to communicate signals from said base station to said wireless terminal are hopped at a first rate and tones used as an uplink to communicate signals from said wireless terminal to said base station are hopped at a second rate which is different from said first rate.

14. The invention as defined in claim 13 wherein said wireless terminal communicating with the base station is communicating voice information.

15. The invention as defined in claim 13 wherein said number of allocated orthogonal tones is one.

16. The invention as defined in claim 13, wherein said first rate is faster than said second rate.

17. The invention of claim 13, wherein said number of tones allocated for use in communicating is a very small number.

18. Apparatus for operating a cellular orthogonal frequency division multiplexing (OFDM) based spread spectrum multiple access wireless system, comprising:

means for allocating a very small number of orthogonal tones for use in communicating low bit rate information; and means for hopping said allocated tones through an available spectrum over time, wherein in a downlink of said system said allocated tones are fast hopped and in an uplink of said system said allocated tones are low hopped.

19. The invention as defined in claim 18 wherein said very small number is one.

20. The invention as defined in claim 18 wherein said low bit rate information is voice.

21. A processor for use in a cellular orthogonal frequency division multiplexing (OFDM) based spread spectrum multiple access wireless system, said processor executing software in computer readable form, said software being arranged in functional modules and comprising:

a module for allocating a very small number of orthogonal tones for use in communicating low bit rate information;

a module for hopping said allocated tones through an available spectrum over time, wherein in a downlink of said system said allocated tones are fast hopped and in an uplink of said system said allocated tones are slow hopped.

22. The invention as defined in claim 21 wherein said very small number is one.

23. The invention as defined in claim 21 wherein said low bit rate information is voice.

24. A method for operating a cellular orthogonal frequency division multiplexing (OFDM) based spread spectrum multiple access wireless system each cell of said OFDM based spread spectrum multiple access wireless system being assigned a set of orthogonal tones which occupy a frequency band, the method comprising the steps of:

allocating a very small number of orthogonal tones for use in communicating voice;

hopping said allocated tones through an available spectrum over time, wherein in a downlink of said system said allocated tones are fast hopped and in an uplink of said system said allocated tones are slow hopped;

wherein said frequency band occupied by said set of orthogonal tones for each cell of said OFDM based spread spectrum multiple access wireless system is substantially identical.

25. A frequency division multiplexing based spread spectrum communications method for communicating information between a base station and a wireless terminal, the method comprising:

hopping, at a first rate, through tones used to implement an downlink that communicates information from said base station to said wireless terminal; and hopping, at a second rate, through tones used to implement an uplink that communicates information from said wireless terminal to said base station, wherein said first and second rates are different.

26. The method of claim 19, wherein the first rate is faster than the second rate.

27. The method of claim 26, wherein the first rate causes a different tone to be used during each symbol period in which a symbol is transmitted.

28. The method of claim 27, wherein the second rate causes the same tone to be used for more than the time used to transmit a symbol.

29. The method of claim 27, further comprising:

performing a symbol interleaving operation so that sequential symbols are transmitted out of order over said uplink.

30. The method of claim 29, wherein said symbol interleaving includes:

using a first interleaving pattern when interleaving symbols corresponding to voice signals; and using a second interleaving pattern when interleaving symbols corresponding to data.

31. The method of claim 30, wherein a single tone is used at any given point in time to implement said uplink.

32. The method of claim 31, further comprising:

operating the base station to deinterleave symbols received from said uplink.

33. The method of claim 32, further comprising:

varying the number of symbols transmitted per unit time as a function of the amount of power allocated per tone.

* * * * *